Patented May 16, 1939

2,158,825

UNITED STATES PATENT OFFICE 2,158,825

PHOTOGRAPHIC EMULSION

Friedrich Lierg, Vienna, Germany, assignor of one-half to Oskar Czeija, Vienna, Germany No Drawing. Application December 2, 1938, Serial No. 243,655. In Austria December 6, 1937

13 Claims. (Cl. 95—7)

This invention relates to a method of producing photographic emulsions on the basis of cellulose esters, and to the products of said method.

In my copending patent application Ser. No. 244,111, filed December 5, 1938, I have already disclosed a method of producing stable photographic emulsions which do not tend to form sediments, by means of cellulose derivatives which are decomposed by an alkali and made light-sensitive by means of halogen silver salts; in the said method colloidal halogen silver having an electric charge opposite that of the carrier colloid formed by the cellulose derivative is introduced or produced in the cellulose derivative, maintaining a part of the charge of the carrier colloid as a residual charge different from zero.

My present invention has for its object to provide a method of producing photographic emulsions based on cellulose esters forming the carrier and protective colloid, i. e., a colloid carrying the molecules of halogen silver and protecting them against aggregation from the colloidal state.

My novel emulsion is produced in such a manner that the carrier colloid and the colloidal halogen silver have the same charge which means that an excess of bromide salt over the silver salt has to be applied in the reaction in which the halogen silver is produced.

Another object of my present invention is to provide process steps which render it unnecessary to remove from the emulsion the salts occurring in the chemical transformations during the production of the emulsion.

Attempts have been made to replace the gelatine of photographic emulsions by another colloid being equivalent to gelatine as a protective colloid but offering additional advantages over gelatine, such as, lower sensitiveness against mechanical injuries in a wet state etc. Collodion has been proposed in many instances as a carrier for the light-sensitive halogen silver, but in the known processes of using collodion the good effect of gelatine as a protective colloid could not be attained since the known emulsions of halogen silver (silver halide) and collodion tend to form sediments and to form back. Therefore, such emulsions have been used practically only for certain special purposes, more particularly in the form of collodion emulsions to be worked in a wet state.

Compared to nitrocellulose in the form of a collodion solution, solutions of acetyl cellulose in volatile organic solvents do not show any carrier and protective colloid effect for halogen silver. Lederer (German Patent 191,326) suggested to emulsify acetyl celluloses by dissolving them in glacial acetic acid, for the production of photographic copying papers of the silver chloride type. Furthermore, Eichengrün in United States Patent 752,388 stated that certain groups of acetyl cellulose which are mainly characterized by the fact that they are soluble in alcohol, are also suitable for emulsifying silver chloride and for the production of copying papers. In recent times it has been found that acetyl celluloses, when hydrolised to an acetyl content of 19 to 33%, form a good protective colloid also for silver bromide emulsions.

The carrier colloid obtained from such acetyl cellulose decomposed to an acetyl content of less than 33%, consists mainly of depolymerisation products of the acetyl cellulose, such as, starch, any only to a small extent of acetyl cellulose so that the favourable properties of acetyl cellulose as a carrier colloid, namely, its mechanical strength more particularly in a wet state, and its solubility in volatile solvents of substantially organic nature is reduced very much.

I have now found that acetyl cellulose containing 42% and more acetyl is very favourable as a carrier and protective colloid for the production of silver bromide emulsions if the acid groups of the cellulose esters are decomposed under action of an alkali. While in all known methods of decomposition under action of acids, as suggested in the above mentioned German and United States patents regarding acetyl cellulose emulsions, the cellulose molecule is strongly attacked and thus depolymerised to decomposition products containing starch, the cellulose molecule remains almost unaffected by alkaline decomposition but is mainly hydrolised only to ester groups (see for instance British Patent 337,868, page 3, line 116).

I have found that even acetyl cellulose partially decomposed by alkali to contain about 30% acetic acid still preserves its tearing strength and elasticity and has a solubility quite different from acetyl cellulose which has been decomposed by acid to the same content of acetic acid. While the latter cellulose loses its solubility in acetone with an acetyl content of less than 40% and then becomes soluble in alcohol and, with a further decrease of the acetyl content becomes soluble in aqueous alcohol, even acetyl cellulose decomposed to an acetyl content of 30% by basic reaction is soluble in acetone, by addition of a certain amount of water. This favourable solubility in connection with the unchanged strength and elasticity renders it possible to cast such acetyl cellulose which has been decomposed to a great extent by basic reaction while this is impossible with acetyl cellulose of the same low content of acetyl, but decomposed by acid reactions.

In connection with the present process a special method of decomposing acetyl cellulose by alkali has been developed for rendering possible a uniform de-esterification, and to obtain an acetyl cellulose product of substantially uniform percentage of acetyl, as required for photographic emulsions. If the solution of acetyl cellulose used for the production of the photographic emulsion would contain a mixture of acetyl cellulose of varying percentage of acetyl, the varying protective effect of the colloid with respect to the halogen silver would be unfavourable for the emulsifying operation as the overloading of the acetyl cellulose portions of lower carrying capacity compared to the portions of higher carrying capacity for halogen silver would cause disturbances, for example, separations.

I obtain a uniform decomposing effect of the lye upon the dissolved acetyl cellulose by dissolving the acetyl cellulose mainly in an organic solvent which does not comprise any hydroxide groups or is not capable of reacting with the split-off acid groups in any manner. For example, alcohols forming esters with these acid groups even if being present in relatively small quantities only, would cause such a rapid decomposition of certain portions of the material to cellulose hydrate and the separation thereof in a flocculent state cannot be prevented by any measures whatever. But also where indifferent or neutral solvents, for example, acetone, are used, separation in a flocculent state occurs at the point where the lye enters, even in case of very slow feed and intensive stirring, as the water of the lye cannot be mixed as quickly with the acetyl cellulose dissolved in acetone as the reaction of the lye upon the acetyl cellulose causing separation in a flocculent state occurs.

According to the present invention this is avoided and a uniform decomposition to an extent corresponding to the total quantity of alkali is obtained by accelerating the distribution of the fed alkali by suitable steps under intensive stirring, and retarding the saponification thereof; this is effected by providing in the acetyl cellulose-solution before the lye is introduced the maximum admissible amount of water, within the limits of the quantities of water required to render the acetyl cellulose soluble in acetone, and, furthermore, by accurately dosing the feeding quantities and the strength of said lye. During the feeding of the lye, the quantity of water is fed at the same time which is required in order that the acetyl cellulose remains soluble in acetone as the decomposition of the acetyl cellulose proceeds. In other words it is required to effect a balance of the feed of water and lye in such a manner that the lye is distributed from the point where it enters before it is saponified. Where this is not possible, for example, in the decomposition of acetyl cellulose of high acetyl content, to acetyl cellulose of very low acetyl content, the quantities of water and lye which have been computed in accordance with the stoichiometric transformation, with a view to attaining the predetermined degree of partial decomposition, are added in two or more steps.

I have found that potash lye unlike soda lye always caused the computed degree of decomposition. It appears that in case of soda lye the formation of sodium cellulose renders the computation of the desired degree of decomposition illusory.

*Example*

100 grs. of acetyl cellulose containing 50% acetic acid are dissolved in 1000 ccm. acetone and when the acetyl cellulose has been dissolved, 300 ccm. water are added; then 17.5 ccm. potash lye of 42° Bé. diluted with the same amount of water are poured into the solution under continuous stirring. After about 20 to 30 minutes the lye is neutralised entirely and an acetyl cellulose containing 41% acetic acid is formed. This decomposed solution does not show any milkiness.

This method offers the important advantage over the existing decomposing methods that a complete transformation in accordance with the stoichiometric reaction is obtained and that the reaction time is very short so that on the one hand the desired percentage of acetyl can be accurately attained, by the addition of the correspondingly computed amount of potash lye and, on the other hand, the saponification can be effected in solvents of the kind usually employed in the further use of the acetyl cellulose solution, more particularly for the production of photographic emulsions.

Such cellulose esters which have been decomposed by alkali preserve their valuable characteristics as a varnish or lacquer and, moreover show a relatively good carrying capacity for halogen silver so that the same does not tend to form sediments. On the other hand, in view of the reduced carrying capacity compared to gelatin it is possible to obtain the same sensitivity with a lower degree of ripeness, i. e., with smaller grain size.

In order to produce an emulsion, for example, from the decomposed acetyl cellulose, acetone is preferably used as a solvent. Now, acetone may also be used as a solvent for the saponification and the finished decomposed solutions may be directly used for the production of the photographic emulsion, since the saponifying potash lye due to its complete transformation to potash acetate cannot more act detrimentally in the production of a photographic emulsion. It is merely required to transform the potash acetate which with silver nitrate forms a compound of low solubility and, therefore, would disturb the smooth transformation of the silver bromide, into a neutral or harmless compound by addition of ammonium nitrate, citric acid or similar substances which are capable of forming aggregated compounds together with said undesirable salts. By way of alternative, said undesirable salts may be transformed into potash nitrate and acetic acid by adding the corresponding quantity of nitric acid or another acid capable of setting free the acetic acid, before introduction of the silver nitrate.

Where it is intended to use for the emulsion a solution of decomposed cellulose ester containing no decomposed salts, this may be effected without loss of the solvent used in the decomposition, by introducing into the decomposed solution, suitable organic liquids which do not dissolve acetyl cellulose, for instance, benzene.

I have found that the mere addition of 20% benzene to the solution of the decomposed acetyl cellulose in acetone is sufficient to cause immediate quantitative precipitation of the acetyl cellulose and to separate sharply from the acetone the whole amount of water together with the decomposed salts so that the acetone may be regained in a pure state, if the small quantity of benzene is neglected, in a suitable separator, without distillation. The benzene may be easily separated from the acetone, for example, by shaking it with sulphuric acid. Small quantities of water are sufficient to wash out any adhering salts from the precipitated acetyl cellulose and it is not necessary to dry the acetyl cellulose in order to dissolve it again in acetone, but it is merely required to squeeze or to centrifuge the acetyl cellulose to reduce the percentage of water to that required for dissolving acetyl cellulose of the respective degree of decomposition in acetone.

Example 13 grs. potash bromide dissolved in 30 ccms. water are added to 200 ccms. of a solution of 10% strength of acetyl cellulose which has been decomposed to a content of 38% of acetic acid and from which the decomposition salts have been removed; the mass is thoroughly mixed and 60 ccms. acetone are added in order to compensate the solvent water.

18 grs. of silver nitrate are also dissolved in 30 ccms. of water and then mixed with 60 ccms. acetone.

This solution of silver nitrate is now introduced into the above mentioned solution of acetyl cellulose with admixed bromide salt, in the form of a thin jet, under continuous stirring, whereby a highly dispersed emulsion is obtained from which the salts are then removed, according to one of the above mentioned methods and which may then be ripened in known manner.

If desired, a part of the total quantity of bromide salt may be replaced by iodides in known manner, and sensitizing agents or other additional substances may be added to the finished emulsion in known manner.

The salts formed in the emulsion by the transformation of the silver bromide tend to accelerate the ripening speed and to increase the sensibility in a similar manner as in the process of producing an emulsion of silver bromide on the basis of gelatine, whereby an excessive ripening would be caused and haze would be formed in the emulsion under action of the developer, even in an unexposed condition thereof. Therefore the emulsion has to be precipitated immediately after it has been finished, by pouring it into water, and washed to remove the salts. The emulsion is then dried and re-dissolved in acetone and is now ready to be cast. The light-sensitive layers thus obtained are stable and capable of being stored. By way of alternative, the salts may be removed from the emulsion in known manner, for instance, by dialysis or by freezing out.

According to a further feature of my invention, I contemplate to carry out the process of the formation of halogen silver in such a manner that salts which would render it necessary to wash the emulsion are not produced at all. To this end, the silver bromide may be produced with the aid of an organic compound of bromine which when dissolved causes more or less ionisation. In this case there are not produced inorganic reaction salts, but organic reaction products which are non-electrolytes and, therefore, do not cause precipitation with respect to colloids and, depending on the kind of the compound of bromine, do not influence the ripening.

By way of example, ethyl bromide may be used in my novel process for the production of silver bromide emulsions based on cellulose ester; the said ethyl bromide is transformed to ethyl nitrate in the process which can be used as a blend for cellulose ester and, as such, is absolutely harmless and ineffective with respect to the silver bromide and the ripening process thereof; it is volatilized when casting the emulsion, together with the other solvents thereof, and regained by condensation.

It is also contemplated, within the purview of this invention, to use silver lactate instead of silver nitrate for transforming the silver bromide and in this case ethyl lactate is obtained as a reaction product which is less volatile and known as a solvent and softening agent in the manufacture of varnish. In this manner, if desired the organic bromine substance may be chosen in such a manner that the reaction product is not volatile at all but remains in the silver bromide-cellulose ester as a softening agent. More particularly the organic bases of the hydrobromic acid comprise a great number of very cheap products and the organic rest may either be left in the emulsion in the same manner as above mentioned or it may be used to form unsoluble salts to neutralize it.

It will be understood that the above mentioned process steps may be applied in the order in which they are stated in the claims and hereinbefore described or in some other order which may be suitable and feasible in special cases as will readily occur to one skilled in the art. Also, the said process may be carried out in such a manner that the single process steps follow each other immediately or the single steps may be carried out at different places and times. For example, the alkaline decomposition may be carried out in a cellulose factory and the decomposed cellulose ester may be supplied to a photographic factory for the introduction of the halogen silver and the casting of the emulsion.

I am aware that many further changes may be made and numerous details of the process may be varied through a wide range without departing from the principles of this invention, and I, therefore, do not purpose limiting the patent granted hereon otherwise than is necessitated by the prior art.

I claim:

1. In a process of producing photographic emulsions, the steps which comprise dissolving cellulose ester in a liquid comprising an organic solvent, introducing into said solution an alkaline agent in order to cause a partial alkaline decomposition thereof, and introducing halogen silver into the decomposed cellulose ester, said halogen silver being produced by reaction of halogen salt and silver salt in such a manner that during all phases of said reaction and after said reaction the quantity of halogen salt exceeds the stoichiometric ratio with respect to the silver salt.

2. In a process of producing photographic emulsions, the steps which comprise dissolving cellulose ester in a liquid comprising an organic solvent, introducing into said solution an alkaline agent in order to cause a partial alkaline decomposition thereof, and introducing halogen silver into said decomposed cellulose ester solution, said halogen silver being produced by reaction of halogen salt and silver salt in such a manner that during all phases of said reaction and after said reaction the quantity of halogen salt exceeds the stoichiometric ratio with respect to the silver salt.

3. In a process of producing photographic emulsions, the steps which comprise dissolving a cellulose ester capable of alkaline saponification in a liquid comprising an organic solvent, adding to the solution the maximum admissible percentage of water within the range of quantities required to render said cellulose ester soluble in said organic solvent, and then gradually adding a quantity of an alkali required to attain a predetermined degree of partial alkaline decomposition of said cellulose ester, in the form of a lye containing water, the quantity of lye introduced in the unity of time and the strength of the lye being so chosen that the distributing speed of the lye in the solution at the point where it is introduced is higher than the saponifying speed of said lye, and introducing halogen silver into the decomposed cellulose ester, said halogen silver being produced by reaction of halogen salt and silver salt in such a manner that during all phases of said reaction and after said reaction the quantity of halogen salt exceeds the stoichiometric ratio with respect to the silver salt.

4. In a process of producing photographic emulsions, the steps which comprise dissolving cellulose ester in a liquid comprising an organic solvent, introducing into said solution an alkaline agent in order to cause a partial alkaline decomposition thereof, said organic solvent being unable to react in any manner upon acid groups split off from the cellulose ester in an alkaline decomposition thereof, and introducing halogen silver into the decomposed cellulose ester, said halogen silver being produced by reaction of halogen salt and silver salt in such a manner that during all phases of said reaction and after said reaction the quantity of halogen salt exceeds the stoichiometric ratio with respect to the silver salt.

5. In a process of producing photographic emulsions, the steps which comprises dissolving acetyl cellulose in a liquid comprising acetone, adding to the solution the maximum admissible percentage of water within the range of quantities required to render acetyl cellulose soluble in acetone and then gradually adding a quantity of an alkali required to attain a predetermined degree of partial alkaline decomposition of said acetyl cellulose, in the form of a lye containing water, the quantity of lye introduced in the unity of time and the strength of the lye being so chosen that the distributing speed of the lye in the solution at the point where it is introduced is higher than the saponifying speed of said lye and introducing halogen silver into the decomposed acetyl cellulose, said halogen silver being produced by reacton of halogen salt and silver salt in such a manner that during all phases of said reaction and after said reaction the quantity of halogen salt exceeds the stoichiometric ratio with respect to the silver salt.

6. In a process of producing photographic emulsions, the steps which comprise dissolving cellulose ester in a liquid comprising an organic solvent, introducing into said solution an alkaline agent in order to cause a partial alkaline decomposition thereof, introducing into the decomposed cellulose ester a halogen silver substance and further introducing, before the formation of said halogen silver, an agent adapted to produce aggregated compounds together with any undesirable silver salts formed in the process.

7. In a process of producing photographic emulsions, the steps which comprise dissolving cellulose ester in a liquid comprising an organic solvent, introducing into said solution an alkaline agent in order to cause a partial alkaline decomposition thereof, and introducing halogen silver into said decomposed cellulose ester solution, said halogen silver being produced by reaction of halogen salt and silver salt, and removing by dialysis any undesirable salts formed in the process.

8. In a process of producing photographic emulsions, the steps which comprise dissolving cellulose ester in a liquid comprising an organic solvent, introducing into said solution an alkaline agent in order to cause a partial alkaline decomposition thereof, introducing halogen silver into said decomposed cellulose ester solution, said halogen silver being produced by reaction of halogen salt and silver salt, and removing by freezing any undesirable salts formed in the process.

9. In a process of producing photographic emulsions, the steps which comprise dissolving cellulose ester in a liquid comprising an organic solvent, introducing into said solution an alkaline agent in order to cause a partial alkaline decomposition thereof, introducing halogen silver into said decomposed cellulose ester solution, said halogen silver being produced by reaction of halogen salt and silver salt, precipitating said celulose ester from said solution by means of an organic liquid which is unable to dissolve said cellulose ester and washing the precipitated cellulose ester to remove the undesirable salts formed in the process.

10. In a process of producing photographic emulsions, the steps which comprise dissolving cellulose ester in a liquid comprising an organic solvent, introducing into said solution an alkaline agent in order to cause a partial alkaline decomposition thereof, and introducing into the decomposed cellulose ester a dissolved halogen salt and thereafter a silver salt in such quantities that during all phases of the reaction resulting in the formation of halogen silver and after said reaction the quantity of halogen salt exceeds the stoichiometric ratio with respect to the silver salt.

11. In a process of producing photographic emulsions, the steps which comprise dissolving cellulose ester in a liquid comprising an organic solvent, introducing into said solution an alkaline agent in order to cause a partial alkaline decomposition thereof and introducing halogen silver into the decomposed cellulose ester, said halogen silver being produced by reaction of an organic bromide compound and silver salt in such a manner that during all phases of said reaction and after said reaction the quantity of said organic bromide compound exceeds the stoichiometric ratio with respect to the silver salt.

12. In a process of producing photographic emulsions, the steps which comprise dissolving cellulose ester in a liquid comprising an organic solvent, introducing into said solution an alkaline agent in order to cause a partial alkaline decomposition thereof, and introducing halogen silver into the decomposed cellulose ester, said halogen silver being produced by reaction of halogen salt and silver salt of an organic acid in such a manner that during all phases of said reaction and after said reaction the quantity of halogen salt exceeds the stoichiometric ratio with respect to the silver salt.

13. In a process of producing photographic emulsions, the steps which comprise dissolving cellulose ester in a liquid comprising an organic solvent, introducing into said solution an alkaline agent in order to cause a partial alkaline decomposition thereof, and sensitizing said partially decomposed cellulose ester by silver halide.

FRIEDRICH LIERG.